United States Patent
Murakami et al.

(10) Patent No.: US 7,508,601 B2
(45) Date of Patent: Mar. 24, 2009

(54) IMAGING LENS

(75) Inventors: Kazuya Murakami, Tokyo (JP); Yoshitomo Onoda, Tokyo (JP); Hotaka Takeuchi, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/754,445

(22) Filed: May 29, 2007

(65) Prior Publication Data
US 2007/0279767 A1 Dec. 6, 2007

(30) Foreign Application Priority Data
May 31, 2006 (JP) ............................. 2006-150771

(51) Int. Cl.
G02B 9/12 (2006.01)
G02B 15/14 (2006.01)
G02B 13/18 (2006.01)
G02B 3/02 (2006.01)

(52) U.S. Cl. .................... 359/791; 359/689; 359/716
(58) Field of Classification Search ................ 359/689, 359/708, 791, 716, 784, 789
See application file for complete search history.

(56) References Cited

U.S. PATENT DOCUMENTS
7,006,305 B2 * 2/2006 Amanai ...................... 359/791

FOREIGN PATENT DOCUMENTS

| JP | 2003-322792 A | 11/2003 |
| JP | 2004-184987 A | 7/2004 |
| JP | 2004-302060 A | 10/2004 |
| JP | 2005-091513 A | 4/2005 |

* cited by examiner

Primary Examiner—Alicia M Harrington
(74) Attorney, Agent, or Firm—Darby & Darby P.C.

(57) ABSTRACT

An imaging lens includes, in order from an object side, a first lens with a positive refractive power having a biconvex shape; an aperture stop having a predetermined aperture diameter; a second lens with a positive refractive power having a concave surface on the object side, at least one of the object-side surface and an image-plane-side surface of the second lens being aspherical; and a third lens with a negative refractive power having a concave surface on the object side and an aspherical surface with an inflection point in an effective-diameter area on the image-plane side, whereby aberrations can be effectively corrected, the total length of the lens system can be reduced to reduce the overall size, in particular the thickness, and a shutter can be readily accommodated.

17 Claims, 5 Drawing Sheets

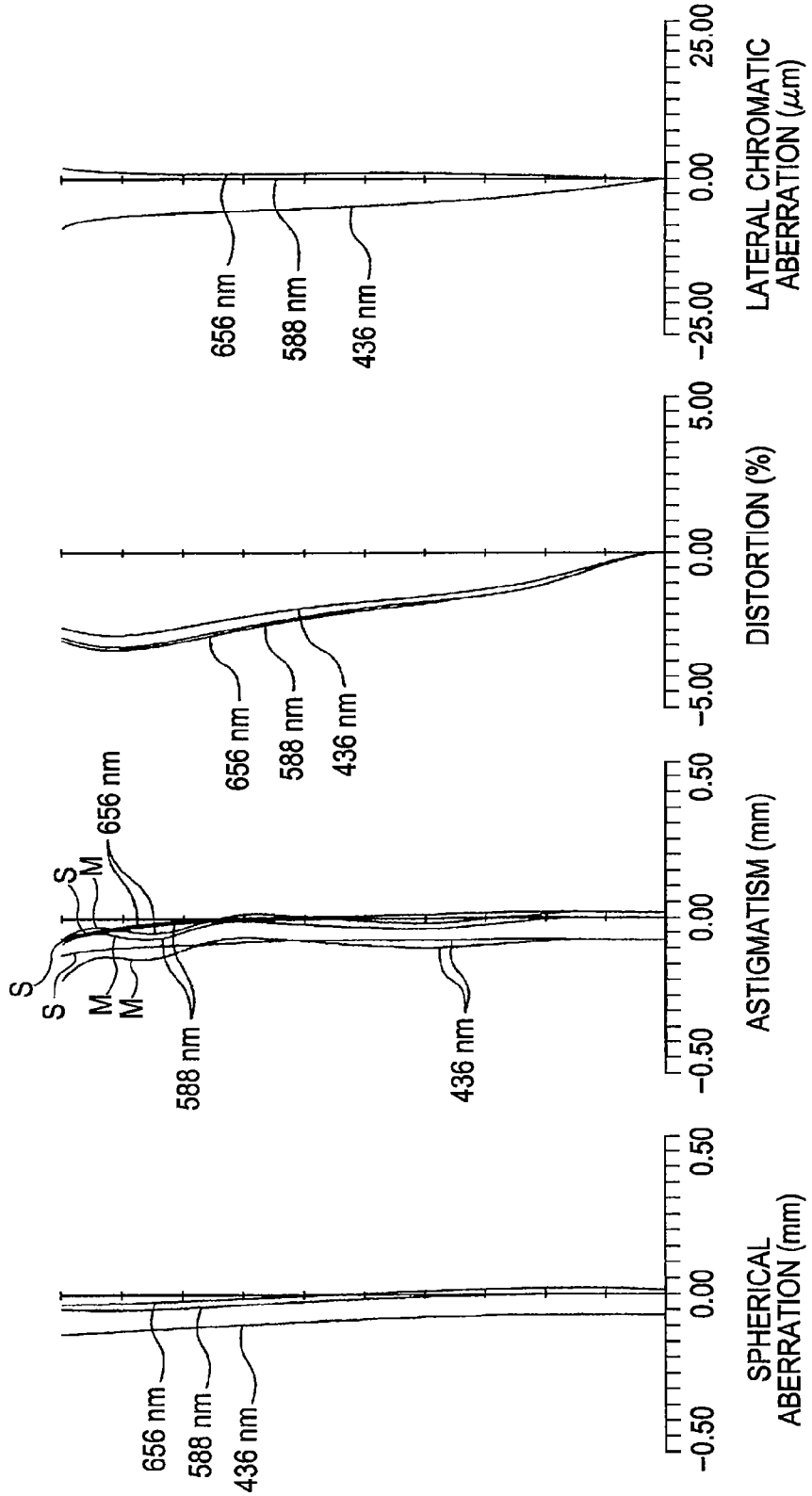

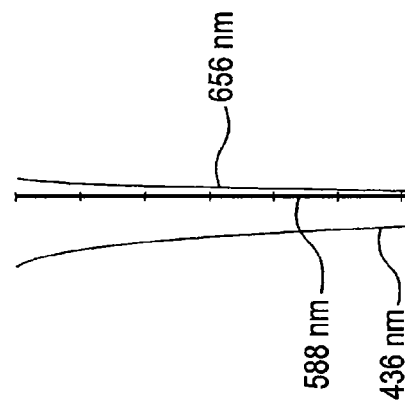

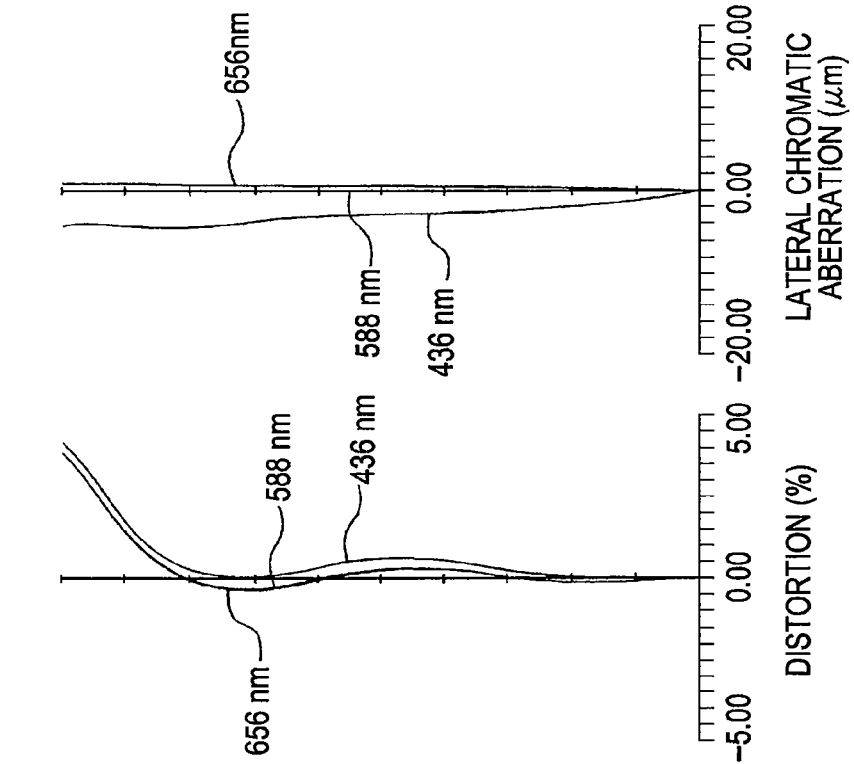

IMAGING LENS

CROSS-REFERENCE TO RELATED APPLICATION

The present application claims priority under 35 U.S.C. §119 to Japanese Patent Application No. 2006-150771, filed May 31, 2006. The content of the application is incorporated herein by reference in its entirety.

BACKGROUND OF THE INVENTION

1. Field of the Invention

The present invention relates to compact imaging lenses used in digital still cameras including solid-state imaging elements, such as Charge Coupled Devices (CCD), and more specifically, to an imaging lens suitable for use in a camera installed in, for example, a mobile phone, a portable personal computer, a personal digital assistant like a portable music player, etc.

2. Description of the Related Art

In the mobile-phone market, models in which cameras are installed, that is, camera-equipped mobile phones, constitute the majority of the market. In particular, models including imaging lenses that have an angle of view (total angle of view) of 60° to 75° and that can be used together with CCDs having one to two million pixels have come into widespread use.

Recently, however, in order to add values to the products, imaging lenses that can be used together with CCDs having a larger number of pixels have been demanded. On the other hand, in solid-state imaging elements, such as CCDs, noise is generated if light is continuously incident thereon while an image is being recorded. Therefore, as the number of pixels in the CCDs is increased, it becomes necessary to block light with a shutter or the like.

Accordingly, recently, small, thin camera-equipped mobile phones including CCDs having large numbers of pixels and equipped with shutters have been preferred.

However, to install a shutter while satisfying the demand for thickness reduction, a space for accommodating the shutter must be provided while reducing the length of the optical system. In addition, aberrations must be corrected. This is difficult for known imaging lenses.

For example, an imaging lens is known which includes, in order from an object side, an aperture stop, a first lens with a negative refractive power having a meniscus shape with a convex surface on the object side, a second lens with a positive refractive power cemented to the first lens, a third lens with a positive refractive power having a meniscus shape with a concave surface on the object side, and a fourth lens with a weak negative refractive power having an aspherical surface on at least one side thereof (see, for example, Japanese Unexamined Patent Application Publication No. 2004-184987).

In this imaging lens, the aperture stop is positioned in front of the first lens. Therefore, when a shutter is installed, a large shutter must be used to block the incident light. Thus, it is difficult to reduce the overall size.

In addition, another imaging lens is known which includes, in order from an object side, a first lens with a positive refractive power having a meniscus shape with a convex surface on the object side, an aperture stop, a second lens with a positive refractive power having a meniscus shape with a concave surface on the object side, and a third lens with a negative refractive power having a concave surface on an image-plane side (see, for example, Japanese Unexamined Patent Application Publication No. 2003-322792).

In this imaging lens, the first lens has a concave surface on the image-plane side and the second lens has a concave surface on the object side. Therefore, the distance between rim portions (edges) of the lenses is small.

Accordingly, in this imaging lens, it is necessary to increase the distance between the first lens and the second lens along an optical axis thereof to place a shutter. Thus, it is difficult to reduce the total lens length.

In addition, still another imaging lens is known which includes a first lens with a positive refractive power having a biconvex shape, an aperture stop, a second lens with a positive refractive power having a convex surface on an object side, and a third lens with a negative refractive power having an aspherical surface on each side thereof, the surface on the object side of the third lens being convex in an area around an optical axis (see, for example, Japanese Unexamined Patent Application Publication No. 2004-302060).

In this imaging lens, although the first lens has a biconvex shape, negative refractive power is reduced because the third lens has a convex surface on the object-side. Therefore, it is difficult to reduce the total length of the lens system, i.e., the distance from the object-side surface of the first lens to an image plane.

SUMMARY OF THE INVENTION

In light of the above-described problems of the known imaging lenses, it is an object of the present invention to provide an imaging lens in which a shutter can be readily accommodated so that the imaging lens can be used together with an imaging element having a large number of pixels, which has an angle of view of about 60° to 75°, which can reduce the total length of the lens system to reduce the overall size, in particular the thickness, and which is suitable for use in a camera installed in, for example, a mobile phone, a portable personal computer, a personal digital assistant like a portable music player, etc.

An imaging lens according to the present invention includes, in order from an object side to an image-plane side, a first lens with a positive refractive power having a biconvex shape; an aperture stop having a predetermined aperture diameter; a second lens with a positive refractive power having a concave surface on the object side, at least one of the object-side surface and an image-plane-side surface of the second lens being aspherical; and a third lens with a negative refractive power having a concave surface on the object side and an aspherical surface with an inflection point in an effective-diameter area on the image-plane side.

According to this structure, an imaging lens which can effectively correct aberrations, which can reduce the total length of the lens system to reduce the overall size, in particular the thickness, and in which a shutter can be readily accommodated can be obtained. Since the first lens and the second lens have positive refractive powers and the third lens has a negative refractive power, the total length of the lens system can be reduced while ensuring a sufficient back focus. Since the third lens has an aspherical surface with an inflection point on the image-plane side, the total length of the lens system can be reduced and the aberrations, in particular the astigmatism and distortion, can be effectively corrected. Since the first lens is a biconvex lens, the distance between rim portions (edges) of the first lens and the second lens can be increased. Therefore, the distance between the centers can be reduced and a shutter can be readily accommodated.

In addition, since the third lens has a concave surface on the object side, the negative refractive power of the third lens can be increased and the total length of the lens system can be reduced.

In the above-described structure, the following conditional expression may be satisfied:

$$0.95 < TL/f < 1.4 \quad (1)$$

where TL is a distance from an object-side surface of the first lens to an image plane, the distance including an air conversion distance for an area between the third lens and the image plane, and f is a focal length of the lens system.

When the value of TL/f satisfies conditional expression (1), the total length of the lens system can be reduced while ensuring an angle of view in the range of 60° to 75°.

In addition, in the above-described structure, the following conditional expression may be satisfied:

$$0.25 < R1/f < 0.65 \quad (2)$$

where R1 is a radius curvature of the object-side surface of the first lens and f is the focal length of the lens system.

When the value of R1/f satisfies conditional expression (2), the object-side surface of the first lens has a suitable radius curvature, so that the total length of the lens system can be reduced and the aberrations, in particular the spherical aberration, can be effectively corrected.

In addition, in the above-described structure, the following conditional expression may be satisfied:

$$0.8 < f2/|f3| < 1.2 \quad (3)$$

where f2 is a focal length of the second lens and f3 is a focal length of the third lens.

When the value of f2/|f3| satisfies conditional expression (3), the total length of the lens system can be reduced while ensuring a desired back focus without being influenced by temperature. In addition, a desired in-focus state can be obtained in a pan-focus mode even when the temperature is high or low.

In addition, in the above-described structure, the following conditional expression may be satisfied:

$$-1.1 < EXP/f < -0.6 \quad (4)$$

where EXP is a paraxial exit pupil position relative to an imaging position of an imaging optical system for an object at infinity and f is the focal length of the lens system.

When the value of EXP/f satisfies conditional expression (4), a shading phenomenon caused by the imaging element, such as the CCD, can be prevented and a certain brightness can be ensured in the image. In addition, the total length of the lens system can be reduced.

In the above-described structure, at least one of the object-side surface and an image-plane-side surface of the first lens may be aspherical, and the object-side surface and the image-plane-side surface of each of the second lens and the third lens may both be aspherical.

In such a case, since the first lens has an aspherical surface, the spherical aberration can be effectively corrected. In addition, since the second lens has an aspherical surface, the coma aberration can be effectively corrected. In addition, since the third lens has an aspherical surface, the field curvature and distortion can be effectively corrected.

In the above-described structure, each of the second lens and the third lens may be a plastic lens.

In such a case, compared to the case in which the lenses are made of glass material, the weight and cost of the lens system can be reduced. In addition, the lens having a complex shape with the inflection point can be easily formed.

In the above-described structure, the following conditional expression may be satisfied:

$$v1 > 50 \quad (5)$$

where v1 is an Abbe number of the first lens.

When the Abbe number v1 of the first lens satisfies conditional expression (5), the chromatic aberration can be effectively corrected.

In the above-described structure, the following conditional expression may be satisfied:

$$D5/f < 0.15 \quad (6)$$

where D5 is an air distance between the second lens and the third lens along an optical axis.

When the value of D5/f satisfies conditional expression (6), the outer diameter of the lens can be reduced and the aberrations, in particular the astigmatism and distortion, can be effectively corrected.

According to the above-described structure, an imaging lens is provided in which a shutter can be readily accommodated so that the imaging lens can be used together with an imaging element having a large number of pixels, which has an angle of view of about 60° to 75°, which can reduce the total length of the lens system to reduce the overall size, in particular the thickness, and which is suitable for use in a camera installed in, for example, a mobile phone, a portable personal computer, a personal digital assistant like a portable music player, etc.

BRIEF DESCRIPTION OF THE DRAWINGS

FIG. 3A to 3D are aberration diagrams of spherical aberration, astigmatism, distortion, and lateral chromatic aberration, respectively, according to a second numerical example;

FIG. 4A to 4D are aberration diagrams of spherical aberration, astigmatism, distortion, and lateral chromatic aberration, respectively, according to a third numerical example; and FIG. 5A to 5D are aberration diagrams of spherical aberration, astigmatism, distortion, and lateral chromatic aberration, respectively, according to a fourth numerical example.

DETAILED DESCRIPTION OF THE INVENTION

An embodiment of the present invention will be described below with reference to the accompanying drawings.

Figure 1:
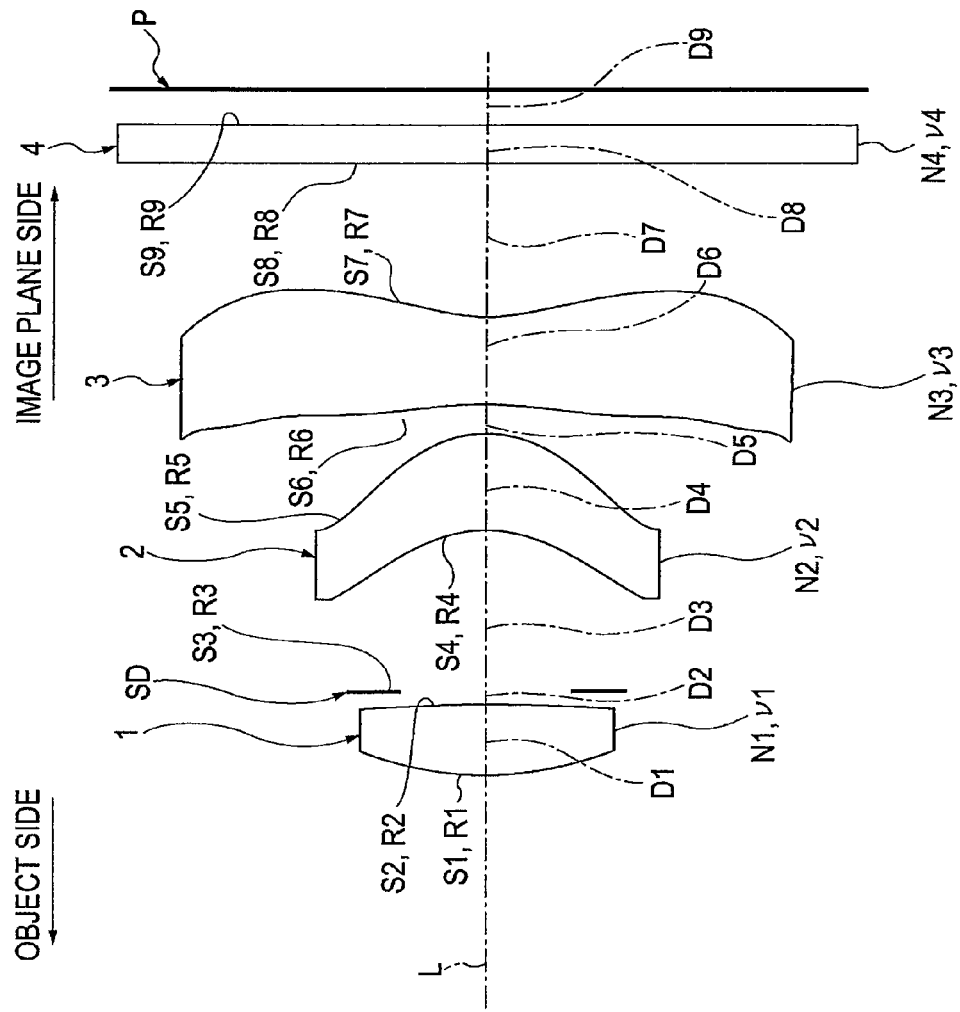
FIG. 1 is a diagram illustrating the structure of an imaging lens according to embodiments of the present invention.

FIG. 1 is a diagram illustrating the structure of an imaging lens according to the embodiment of the present invention. FIGS. 2A to 5D show aberration diagrams corresponding to numerical examples.

As shown in FIG. 1, the imaging lens includes, in order from an object side to an image-plane side, a first lens 1 with a positive refractive power having a biconvex shape; an aperture stop SD having a predetermined aperture diameter; a second lens 2 with a positive refractive power having a concave surface on the object side, at least one of the object-side surface and an image-plane-side surface of the second lens 2 being aspherical; and a third lens 3 with a negative refractive power having a concave surface on the object side and an aspherical surface with an inflection point in an effective-diameter area on the image-plane side.

A glass filter 4, such as a cover glass and an infrared cut filter, made of glass material is positioned behind the third lens 3. In addition, an image plane P is positioned behind the glass filter 4.

As shown in FIG. 1, with regard to the first to third lenses 1 to 3 and the glass filter 4, surfaces are denoted by Si (i=1 to 9) and radius curvatures of the respective surfaces Si are denoted by Ri (i=1 to 9). In addition, refractive indices with respect to d-lines and Abbe numbers of the first to third lenses 1 to 3 and the glass filter 4 are denoted by Ni (i=1 to 4) and vi (i=1 to 4), respectively. In addition, distances (thicknesses or air distances) along an optical axis L in the area between the first lens 1 to the image plane P are denoted by Di (i=1 to 9).

In addition, f indicates a focal length of the lens system, f2 indicates a focal length of the second lens 2, f3 indicates a focal length of the third lens 3, TL indicates the total length of the lens system, i.e., the distance from an object-side surface S1 of the first lens 1 to the image plane P (air-conversion distance for the glass filter 4), D5 indicates the distance between the second lens 2 and the third lens 3 along the optical axis, and EXP indicates a paraxial exit pupil position relative to an imaging position of an imaging optical system for an object at infinity.

The first lens 1 is made of glass material. As shown in FIG. 1, the first lens 1 is a biconvex lens with a positive refractive power in which the object-side surface S1 and an image-plane-side surface S2 are both convex.

At least one of the object-side surface S1 and the image-plane-side surface S2 is preferably aspherical. In such a case, a spherical aberration can be effectively corrected.

The second lens 2 is preferably formed of plastic material (plastic lens). As shown in FIG. 1, the second lens 2 is a meniscus lens with a positive refractive power in which an object-side surface S4 is concave and an image-plane-side surface S5 is convex.

In the case in which the second lens 2 is a plastic lens, compared to the case in which the second lens 2 is made of glass material, the process of forming the second lens 2 can be simplified and the weight and cost of the lens system can be reduced.

At least one of the object-side surface S4 and the image-plane-side surface S5 is aspherical. Preferably, the object-side surface S4 and the image-plane-side surface S5 are both aspherical. In such a case, a coma aberration can be effectively corrected.

The third lens 3 is preferably formed of plastic material (plastic lens). As shown in FIG. 1, the third lens 3 is a lens with a negative refractive power in which an object-side surface S6 is concave and an image-plane-side surface S7 is concave in an area near the optical axis L and has an inflection point within an effective-diameter area such that the image-plane-side surface S7 and is convex in other areas.

In the case in which the third lens 3 is a plastic lens, compared to the case in which the third lens 3 is made of glass material, the process of forming the third lens 3 can be simplified and the weight and cost of the lens system can be reduced. In addition, even though the third lens 3 has a complex shape with the inflection point, the third lens 3 can be easily formed.

The image-plane-side surface S7 is aspherical. Preferably, both the object-side surface S6 and the image-plane-side surface S7 are aspherical. In such a case, field curvature and distortion can be effectively corrected.

Since the first lens 1 and the second lens 2 have the positive refractive powers and the third lens 3 has the negative refractive power, the total length TL of the lens system can be reduced while ensuring a sufficient back focus.

In addition, since the image-plane-side surface S7 of the third lens 3 has an aspherical shape with an inflection point, the total length TL of the lens system can be reduced and the aberrations, in particular the astigmatism and distortion, can be effectively corrected.

In addition, since the first lens 1 is a biconvex lens, the distance between rim portions (edges) of the first lens 1 and the second lens 2 can be increased. Therefore, the distance between the centers along the optical axis L can be reduced and a shutter can be readily accommodated.

In addition, since the object-side surface S7 of the third lens 3 is convex (in the area near the optical axis L), the negative refractive power of the third lens can be increased and the total length TL of the lens system can be reduced accordingly.

Thus, an imaging lens can be obtained which can effectively correct aberrations, such as the spherical aberration, the astigmatism, the distortion, and the chromatic aberration, which can reduce the total length TL of the lens system to reduce the overall size, in particular the thickness, and in which a shutter can be easily accommodated.

The aspherical surfaces of the first lens 1, the second lens 2, and the third lens 3 are defined by the following equation:

$$Z=Cy^2/[1+(1-\epsilon C^2 y^2)^{1/2}]+Dy^4+Ey^6+Fy^8+Gy^{10}+Hy^{12}$$

where Z is the distance from the tangent surface at the vertex of the aspherical surface to the point on the aspherical surface where the height from the optical axis L is y, y is the height from the optical axis, C is the curvature (=1/R) at the vertex of the aspherical surface, $\epsilon$ is the conic constant, and D, E, F, G, and H are aspherical coefficients.

In the imaging lens having the above-described structure, the distance TL from the object-side surface S1 of the first lens 1 to the image plane P (air-conversion distance for the glass filter 4) and the focal length f of the lens system preferably satisfy the following conditional expression:

$$0.95 < TL/f < 1.4 \qquad (1)$$

Conditional expression (1) defines the total length of the lens system relative to the focal length. If the value of TL/f exceeds the upper limit of conditional expression (1), the total length of the lens system becomes too long and it becomes difficult to reduce the size, in particular, the length of the lens system. If the value of TL/f is reduced to below the lower limit of conditional expression (1), the focal length becomes too long and the angle of view is reduced. When the value of TL/f satisfies conditional expression (1), the total length of the lens system can be reduced while ensuring an angle of view in the range of 60° to 75°.

In the imaging lens having the above-described structure, the radius curvature R1 of the object-side surface S1 of the first lens 1 and the focal length f of the lens system preferably satisfy the following conditional expression:

$$0.25 < R1/f < 0.65 \qquad (2)$$

Conditional expression (2) defines the radius curvature of the first lens relative to the focal length. If the value of R1/f exceeds the upper limit of conditional expression (2), the radius curvature R1 of the object-side surface S1 of the first lens 1 becomes too large and it becomes necessary to increase the refractive powers of other lenses to reduce the total length. As a result, it becomes difficult to correct the aberrations. If the value of R1/f is reduced to below the lower limit of conditional expression (2), the radius curvature R1 of the object-side surface S1 of the first lens 1 becomes too small (the curvature becomes too large). As a result, it becomes difficult to correct the aberrations, in particular the spherical aberration. When the value of R1/f satisfies conditional expression (2), the object-side surface S1 of the first lens 1 has a suitable radius curvature R1, so that the total length TL of the lens system can be reduced and the aberrations, in particular the spherical aberration, can be effectively corrected.

In the imaging lens having the above-described structure, the focal length f2 of the second lens 2 and the focal length f3 of the third lens 3 preferably satisfy the following conditional expression:

$$0.8 < f2/|f3| < 1.2 \tag{3}$$

Conditional expression (3) defines the relationship between the focal lengths of the second lens 2 and the third lens 3. If the value of f2/|f3| is out of the range of conditional expression (3), the back focus largely varies in accordance with variation in the refractive index caused by temperature variation. Therefore, it is necessary to make allowance for variation in the amount of focus in a lens unit having an autofocus function. As a result, it becomes difficult to reduce the total length of the lens system. In addition, in a pan-focus mode, it becomes difficult to focus when the temperature is high or low. When the value of f2/|f3| satisfies conditional expression (3), the total length TL of the lens system can be reduced while ensuring a desired back focus without being influenced by temperature. In addition, a desired in-focus state can be obtained in a pan-focus mode even when the temperature is high or low.

In the imaging lens having the above-described structure, a paraxial exit pupil position EXP relative to the imaging position of the imaging optical system for an object at infinity and the focal length f of the lens system preferably satisfy the following conditional expression:

$$-1.1 < EXP/f < -0.6 \tag{4}$$

Conditional expression (4) defines the exit pupil position relative to the focal length. If the value of EXP/f exceeds the upper limit of conditional expression (4), the exit pupil position becomes too close and the incidence angle on the CCD becomes large, which leads to a so-called shading phenomenon or vignetting in which light beams are blocked at a microlens in the CCD and a peripheral area of the image becomes dark. If the value of EXP/f is below the lower limit of conditional expression (4), the exit pupil position becomes too far and it becomes difficult to reduce the total length of the lens system. When the value of EXP/f satisfies conditional expression (4), the shading phenomenon caused by the imaging element, such as the CCD, can be prevented and a certain brightness can be ensured in the image. In addition, the total length TL of the lens system can be reduced.

In the imaging lens having the above-described structure, the Abbe number ν1 of the first lens 1 preferably satisfies the following conditional expression:

$$\nu 1 > 50 \tag{5}$$

When the Abbe number ν1 of the first lens 1 satisfies conditional expression (5), the chromatic aberration can be effectively corrected.

In the imaging lens having the above-described structure, the distance (air distance) D5 between the second lens 2 and the third lens 3 along the optical axis L preferably satisfies the following conditional expression:

$$D5/f < 0.15 \tag{6}$$

If the value of D5/f exceeds the upper limit of conditional expression (6), it becomes difficult to reduce the outer diameter of the lens system. In addition, it becomes difficult to correct the aberrations, in particular the astigmatism and distortion. In other words, when the value of D5/f satisfies conditional expression (6), the outer diameter of the lens can be reduced and the aberrations, in particular the astigmatism and distortion can be effectively corrected.

First to fourth numerical examples of the above-described imaging lens will be described below.

FIRST NUMERICAL EXAMPLE

Figures 2A, 2B, 2C, 2D:
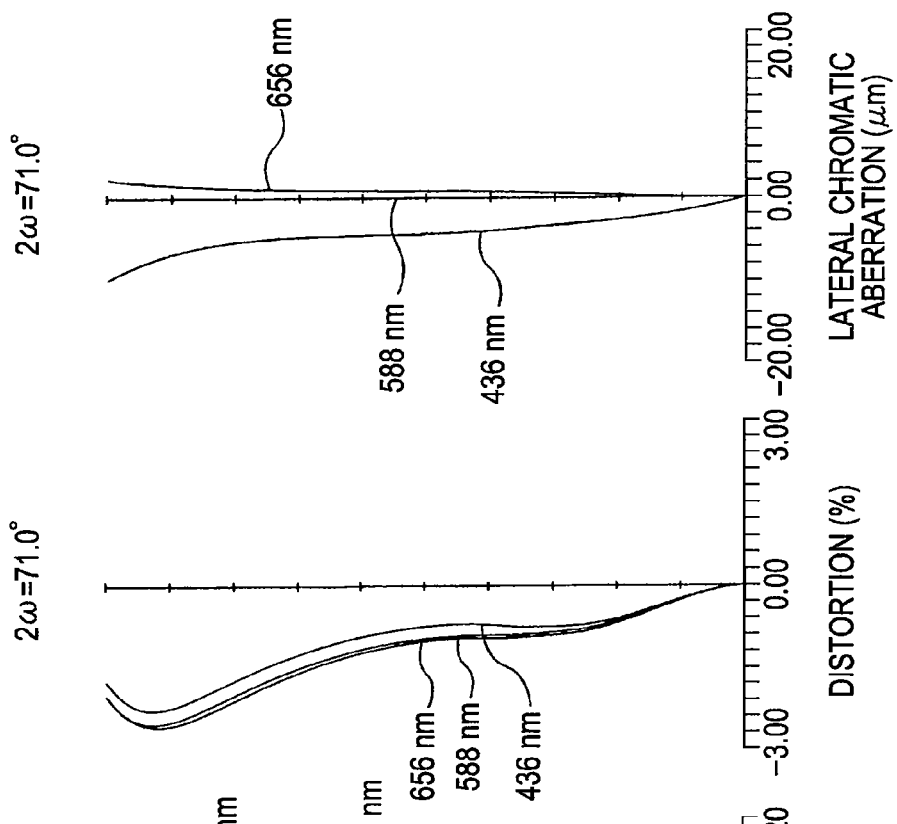
FIGS. 2A to 2D are aberration diagrams of spherical aberration, astigmatism, distortion, and lateral chromatic aberration, respectively, according to a first numerical example.

Major specifications, numerical data (set values), and values of conditional expressions (1) to (6) of the first numerical example are shown below. The spherical aberration, astigmatism, distortion, and lateral chromatic aberration of the first numerical example are shown in FIGS. 2A to 2D, respectively. In FIG. 2B, which shows the astigmatism, S denotes the astigmatism on the sagittal plane and M denotes the astigmatism on the meridional plane.

<Values of Conditional Expressions>

$$TL/f = 5.12/4.05 = 1.26 \tag{1}$$

$$R1/f = 2.306/4.05 = 0.57 \tag{2}$$

$$f2/|f3| = 1.92/1.98 = 0.97 \tag{3}$$

$$EXP/f = -3.74/4.05 = -0.92 \tag{4}$$

$$\nu 1 = 81.13$$

$$D5/f = 0.1/4.05 = 0.02 \tag{6}$$

<Specifications>

Object distance=∞ (INF), focal length f of the lens system=4.05 mm, focal length f2 of the second lens 2=1.92 mm, focal length f3 of the third lens 3=−1.98 mm, F number (FNo.)=2.87, angle of view 2ω=71.0°, exit pupil position=−3.74 mm, total lens length=3.45 mm, total length TL of the lens system (air-conversion distance)=5.12 mm, back focus (air-conversion distance)=1.67 mm.

<Radius Curvatures Ri of First to Third Lenses 1 to 3 and Glass Filter 4>

R1=2.306 mm (aspherical), R2=−300.000 mm (aspherical), R3=∞ (aperture stop), R4=−1.268 mm (aspherical), R5=−0.687 mm (aspherical), R6=−14.105 mm (aspherical), R7=1.156 mm (aspherical), R8=∞, R9=∞

<Distance (mm) Between Surfaces Along Optical Axis>

D1=0.520 mm, D2=0.120 mm, D3=1.224 mm, D4=0.779 mm, D5=0.100 mm, D6=0.711 mm, D7=1.219 mm, D8=0.300 mm, D9=0.250 mm

<Refractive Index Ni (d-line) of First to Third Lenses 1 to 3 and Glass Filter 4>

N1=1.49400, N2=1.52512, N3=1.52512, N4=1.51680

<Abbe Number νi of First to Third Lenses 1 to 3 and Glass Filter 4>

ν1=81.13, ν2=56.29, ν3=56.29, ν4=64.20

In the first numerical example, the surfaces S1 and S2 of the first lens 1, the surfaces S4 and S5 of the second lens 2, and the surfaces S6 and S7 of the third lens 3 are all aspherical.

<Numerical Data of Aspherical Coefficients>

<Surface S1>

ε=0.18718600, D=−0.17946834×10⁻¹, E=0.37396167×10⁻¹, F=−0.10644342, G=0.90374798×10⁻¹, H=−0.30399087×10⁻¹

<Surface S2>
ε=1.00000000, D=−0.17788914×10⁻¹, E=−0.39359458×10⁻¹, F=0.79724310×10⁻¹, G=−0.12201876, H=0.74939030×10⁻¹

<Surface S4>
ε=1.09765600, D=−0.91447303×10⁻¹, E=0.14293142×10⁻¹, F=0.19047362, G=−0.12385425×10⁻¹, H=−0.26473870×10⁻¹

<Surface S5>
ε=−1.77478700, D=−0.30825904, E=0.27569485, F=−0.22925956, G=0.16600416, H=−0.41423070×10⁻¹

<Surface S6>
ε=1.00000000, D=0.18599847×10⁻¹, E=0.27996301×10⁻², F=−0.51198499×10⁻², G=0.13523473×10⁻², H=−0.10962761×10⁻³

<Surface S7>
ε=−9.91038000, D=−0.53839587×10⁻¹, E=0.15740733×10⁻¹, F=−0.36035420×10⁻², G=0.34877027×10⁻³, H=−0.11129235×10⁻⁴

In the first numerical example, the total length TL of the lens system is 5.12 mm, the angle of view 2ω is 71.0°, and the F number is 2.87. Thus, an imaging lens which can effectively correct the aberrations to provide high optical performance, which can reduce the total length of the lens system, and in which a shutter can be readily accommodated is obtained.

SECOND NUMERICAL EXAMPLE

Major specifications, numerical data (set values), and values of conditional expressions (1) to (6) of the second numerical example are shown below. The spherical aberration, astigmatism, distortion, and lateral chromatic aberration of the second numerical example are shown in FIGS. 3A to 3D, respectively. In FIG. 3B, which shows the astigmatism, S denotes the astigmatism on the sagittal plane and M denotes the astigmatism on the meridional plane.

<Values of Conditional Expressions>

$TL/f=5.14/4.08=1.26$ (1)

$R1/f=2.17/4.08=0.53$ (2)

$|f2|/|f3|=1.79/1.75=1.02$ (3)

$EXP/f=-3.57/4.08=-0.88$ (4)

$v1=81.13$ (5)

$D5/f=0.1/4.08=0.02$ (6)

<Specifications>
Object distance=∞(INF), focal length f of the lens system=4.08 mm, focal length f2 of the second lens 2=1.79 mm, focal length f3 of the third lens 3=−1.75 mm, F number (FNo.)=2.89, angle of view 2ω=70.9°, exit pupil position=−3.57 mm, total lens length=3.56 mm, total length TL of the lens system (air-conversion distance)=5.14 mm, back focus (air-conversion distance)=1.58 mm <Radius Curvatures Ri of First to Third Lenses 1 to 3 and Glass Filter 4>
R1=2.170 mm (aspherical), R2=−300.000 mm (aspherical), R3=∞ (aperture stop), R4=−1.222 mm (aspherical), R5=−0.676 mm (aspherical), R6=−40.902 mm (aspherical), R7=0.957 mm (aspherical), R8=∞, R9=∞

<Distance (mm) Between Surfaces Along Optical Axis>
D1=0.520 mm, D2=0.120 mm, D3=1.170 mm, D4=0.932 mm, D5=0.100 mm, D6=0.720 mm, D7=1.133 mm, D8=0.300 mm, D9=0.250 mm <Refractive Index Ni (d-line) of First to Third Lenses 1 to 3 and Glass Filter 4>
N1=1.49400, N2=1.52512, N3=1.52512, N4=1.51680

<Abbe Number vi of First to Third Lenses 1 to 3 and Glass Filter 4>
v1=81.13, v2=56.29, v3=56.29, v4=64.20

In the second numerical example, the surfaces S1 and S2 of the first lens 1, the surfaces S4 and S5 of the second lens 2, and the surfaces S6 and S7 of the third lens 3 are all aspherical.

<Numerical Data of Aspherical Coefficients>

<Surface S1>
ε=0.53288500, D=−0.15265428×10⁻¹, E=−0.12240403×10⁻¹, F=−0.23733781×10⁻¹, G=0.13792073×10⁻¹, H=−0.12071680×10⁻¹

<Surface S2>
ε=1.00000000, D=−0.3081454×10⁻¹, E=−0.40106534×10⁻¹, F=0.33054759×10⁻¹, G=−0.33692755×10⁻¹, H=0.56615606×10⁻²

<Surface S4>
ε=1.11398000, D=0.23181256×10⁻¹, E=−0.34923950, F=0.66753229, G=−0.39702502, H=0.11535900

<Surface S5>
ε=−2.02622000, D=−0.31193731, E=0.29738780, F=−0.27700472, G=0.17112800, H=−0.36612265×10⁻¹

<Surface S6>
ε=1.00000000, D=−0.13180721×10⁻¹, E=0.15736630×10⁻¹, F=−0.55291162×10⁻², G=0.88529076×10⁻³, H=−0.56153739×10⁻⁴

<Surface S7>
ε=−8.05049600, D=−0.56097976×10⁻¹, E=0.17214646×10⁻¹, F=−0.39762493×10⁻², G=0.49088459×10⁻³, H=−0.26073358×10⁻⁴

In the second numerical example, the total length TL of the lens system is 5.14 mm, the angle of view 2ω is 70.9°, and the F number is 2.89. Thus, an imaging lens which can effectively correct the aberrations to provide high optical performance, which can reduce the total length of the lens system, and in which a shutter can be readily accommodated is obtained.

THIRD NUMERICAL EXAMPLE

Major specifications, numerical data (set values), and values of conditional expressions (1) to (6) of the third numerical example are shown below. The spherical aberration, astigmatism, distortion, and lateral chromatic aberration of the third numerical example are shown in FIGS. 4A to 4D, respectively. In FIG. 4B, which shows the astigmatism, S denotes the astigmatism on the sagittal plane and M denotes the astigmatism on the meridional plane.

<Values of Conditional Expressions>

$TL/f=5.13/4.08=1.26$ (1)

$R1/f=2.288/4.08=0.56$ (2)

$|f2|/|f3|=1.81/1.77=1.02$ (3)

$EXP/f=-3.60/4.08=-0.88$ (4)

$\nu1=81.13$ (5)

$D5/f=0.1/4.08=0.02$ (6)

<Specifications> object distance=∞ (INF), focal length f of the lens system=4.08 mm, focal length f2 of the second lens 2=1.81 mm, focal length f3 of the third lens 3=−1.77 mm, F number (FNo.)=2.89, angle of view 2ω=70.7°, exit pupil position=−3.60 mm, total lens length=3.50 mm, total length TL of the lens system (air-conversion distance)=5.13 mm, back focus (air-conversion distance)=1.62 mm <Radius Curvatures Ri of First to Third Lenses 1 to 3 and Glass Filter 4>

R1=2.288 mm (aspherical), R2=−300.000 mm (aspherical), R3=∞ (aperture stop), R4=−1.294 mm (aspherical), R5=−0.668 mm (aspherical), R6=−10.473 mm (aspherical), R7=1.046 mm (aspherical), R8=∞, R9=∞

<Distance (mm) between Surfaces along Optical Axis>

D1=0.530 mm, D2=0.120 mm, D3=1.210 mm, D4=0.823 mm, D5=0.100 mm, D6=0.720 mm, D7=1.176 mm, D8=0.300 mm, D9=0.250 mm

<Refractive Index Ni (d-line) of First to Third Lenses 1 to 3 and Glass Filter 4>

N1=1.49400, N2=1.52512, N3=1.52512, N4=1.51680

<Abbe Number νi of First to Third Lenses 1 to 3 and Glass Filter 4>

$\nu1=81.13$, $\nu2=56.29$, $\nu3=56.29$, $\nu4=64.20$

In the third numerical example, the surfaces S1 and S2 of the first lens 1, the surfaces S4 and S5 of the second lens 2, and the surfaces S6 and S7 of the third lens 3 are all aspherical.

<Numerical Data of Aspherical Coefficients>

<Surface S1>

$\epsilon=-0.40000000$, $D=-0.23822211\times10^{-2}$, $E=-0.59528415\times10^{-2}$, $F=-0.14128411\times10^{-1}$, $G=-0.43605529\times10^{-2}$, $H=0.63906745\times10^{-2}$ <Surface S2>

$\epsilon=1.00000000$, $D=-0.21612204\times10^{-1}$, $E=-0.17162733\times10^{-1}$, $F=-0.58107269\times10^{-2}$, $G=-0.26526297\times10^{-2}$, $H=0.21455586\times10^{-1}$ <Surface S4>

$\epsilon=1.15400000$, $D=-0.81107660\times10^{-1}$, $E=-0.84671333\times10^{-2}$, $F=0.17623341$, $G=-0.11766912\times10^{-1}$, $H=-0.16063978\times10^{-1}$ <Surface S5>

$\epsilon=-1.88400000$, $D=-0.30479236$, $E=0.26583755$, $F=-0.23428207$, $G=0.16571839$, $H=-0.39729107\times10^{-1}$ <Surface S6>

$\epsilon=-217.00000000$, $D=0.44007161\times10^{-2}$, $E=-0.70798509\times10^{-3}$, $F=-0.13981354\times10^{-3}$, $G=0.60261281\times10^{-5}$, $H=0.39072005\times10^{-5}$ <Surface S7>

$\epsilon=-9.48200000$, $D=-0.53696024\times10^{-1}$, $E=0.13972524\times10^{-1}$, $F=-0.32137397\times10^{-2}$, $G=0.38859404\times10^{-3}$, $H=-0.20808805\times10^{-4}$ In the third numerical example, the total length TL of the lens system is 5.13 mm, the angle of view 2ω is 70.7°, and the F number is 2.89. Thus, an imaging lens which can effectively correct the aberrations to provide high optical performance, which can reduce the total length of the lens system, and in which a shutter can be readily accommodated is obtained.

FOURTH NUMERICAL EXAMPLE

Major specifications, numerical data (set values), and values of conditional expressions (1) to (6) of the fourth numerical example are shown below. The spherical aberration, astigmatism, distortion, and lateral chromatic aberration of the fourth numerical example are shown in FIGS. 5A to 5D, respectively. In FIG. 5B, which shows the astigmatism, S denotes the astigmatism on the sagittal plane and M denotes the astigmatism on the meridional plane.

<Values of Conditional Expressions>

$TL/f=5.12/4.02=1.27$ (1)

$R1/f=2.059/4.02=0.51$ (2)

$|f2/f3|=1.70/1.68=1.01$ (3)

$EXP/f=-3.44/4.02=-0.85$ (4)

$\nu1=81.13$ (5)

$D5/f=0.1/4.02=0.02$ (6)

<Specifications> object distance=∞ (INF), focal length f of the lens system=4.02 mm, focal length f2 of the second lens 2=1.70 mm, focal length f3 of the third lens 3=−1.68 mm, F number (FNo.)=2.86, angle of view 2ω=68.8°, exit pupil position=−3.44 mm, total lens length=3.61 mm, total length TL of the lens system (air-conversion distance)=5.12 mm, back focus (air-conversion distance)=1.40 mm <Radius Curvatures Ri of First to Third Lenses 1 to 3 and Glass Filter 4>

R1=2.059 mm (aspherical), R2=−600.000 mm (aspherical), R3=∞ (aperture stop), R4=−1.320 mm (aspherical), R5=−0.667 mm (aspherical), R6=−13.914 mm (aspherical), R7=0.959 mm (aspherical), R8=∞, R9=∞

<Distance (mm) Between Surfaces Along Optical Axis>

D1=0.520 mm, D2=0.120 mm, D3=1.224 mm, D4=0.779 mm, D5=0.100 mm, D6=0.711 mm, D7=1.220 mm, D8=0.300 mm, D9=0.250 mm

<Refractive Index Ni (d-line) of First to Third Lenses 1 to 3 and Glass Filter 4>

N1=1.49400, N2=1.52512, N3=1.52512, N4=1.51680

<Abbe Number νi of First to Third Lenses 1 to 3 and Glass Filter 4>

$\nu1=81.13$, $\nu2=56.29$, $\nu3=56.29$, $\nu4=64.20$

In the fourth numerical example, the surfaces S1 and S2 of the first lens 1, the surfaces S4 and S5 of the second lens 2, and the surfaces S6 and S7 of the third lens 3 are all aspherical.

<Numerical Data of Aspherical Coefficients>

<Surface S1>

$\epsilon=1.75007480$, $D=-0.12335476\times10^{-1}$, $E=0.16849081\times10^{-1}$, $F=-0.86519682\times10^{-1}$, $G=0.88680146\times10^{-1}$, $H=-0.39629367\times10^{-1}$ <Surface S2>

$\epsilon=1.00000000$, $D=-0.39404243\times10^{-1}$, $E=-0.67078316\times10^{-2}$, $F=0.10640729\times10^{-1}$, $G=-0.42275696\times10^{-1}$, $H=0.20003149\times10^{-1}$ <Surface S4>

$\epsilon$=1.25967080, D=−0.75462409×10⁻¹, E=−0.18416226, F =0.42439865, G=−0.28423555, H=0.10413638

<Surface S5>

$\epsilon$=−2.14171000, D=−0.34489097, E=0.34650588, F=−0.32591347, G=0.19166926, H=−0.39715336×10⁻¹

<Surface S6>

$\epsilon$=16.97320000, D=−0.20748373×10⁻¹, E=15809976× 10⁻¹, F=−0.38668533×10⁻², G=0.48567350×10⁻³, H=−0.27242761×10⁻⁴

<Surface S7>

$\epsilon$=−7.88894100, D=−0.60280040×10⁻¹, E=0.15809976× 10⁻¹, F=−0.38412874×10⁻², G=0.59199583×10⁻³, H=−0.36832770×10⁻⁴

In the fourth numerical example, the total length TL of the lens system is 5.12 mm, the angle of view 2ω is 68.8°, and the F number is 2.86. Thus, an imaging lens which can effectively correct the aberrations to provide high optical performance, which can reduce the total length of the lens system, and in which a shutter can be readily accommodated is obtained.

As described above, the present invention provides an imaging lens in which a shutter can be readily accommodated so that the imaging lens can be used together with an imaging element having a large number of pixels, which has an angle of view of about 60° to 75°, and which can reduce the total length of the lens system to reduce the overall size, in particular the thickness. Accordingly, the imaging lens according to the present invention is suitable for use in a camera installed in, for example, a mobile phone, a portable personal computer, a personal digital assistant like a portable music player, etc. The imaging lens according to the present invention is, of course, also useful in other types of digital cameras that are not required to be reduced in size.

What is claimed is:

1. An imaging lens comprising, in order from an object side to an image-plane side: a first lens with a positive refractive power having a biconvex shape; an aperture stop having a predetermined aperture diameter; a second lens with a positive refractive power having a concave surface on the object side, at least one of the object-side surface and an image-plane-side surface of the second lens being aspherical; a third lens with a negative refractive power having a concave surface on the object side and an aspherical surface with an inflection point in an effective-diameter area on the image-plane side; and wherein the following conditional expression is satisfied: 0.95<TL/f<1.4 where TL is a distance from an object-side surface of the first lens to an image plane, the distance including an air conversion distance for an area between the third lens and the image plane, and f is a focal length of the lens system.

2. The imaging lens according to claim 1, wherein the following conditional expression is satisfied: 0.25<R1/f<0.65 where R1 is a radius curvature of the object-side surface of the first lens and f is the focal length of the lens system.

3. The imaging lens according to claim 2, wherein the following conditional expression is satisfied: −1.1<EXP/f<−0.6 where EXP is a paraxial exit pupil position relative to an imaging position of an imaging optical system for an object at infinity and f is the focal length of the lens system.

4. The imaging lens according to claim 2, wherein the following conditional expression is satisfied: 0.8<f2/|f3|<1.2 where f2 is a focal length of the second lens and f3 is a focal length of the third lens.

5. The imaging lens according to claim 2, wherein at least one of the object-side surface and an image-plane-side surface of the first lens is aspherical, and wherein the object-side surface and the image-plane-side surface of each of the second lens and the third lens are both aspherical.

6. The imaging lens according to claim 4, wherein at least one of the object-side surface and an image-plane-side surface of the first lens is aspherical, and wherein the object-side surface and the image-plane-side surface of each of the second lens and the third lens are both aspherical.

7. The imaging lens according to claim 4, wherein each of the second lens and the third lens is a plastic lens.

8. The imaging lens according to claim 4, wherein the following conditional expression is satisfied: −1.1<EXP/f<−0.6 where EXP is a paraxial exit pupil position relative to an imaging position of an imaging optical system for an object at infinity and f is the focal length of the lens system.

9. The imaging lens according to claim 8, wherein each of the second lens and the third lens is a plastic lens.

10. The imaging lens according to claim 8, wherein at least one of the object-side surface and an image-plane-side surface of the first lens is aspherical, and wherein the object-side surface and the image-plane-side surface of each of the second lens and the third lens are both aspherical.

11. The imaging lens according to claim 10, wherein the following conditional expression is satisfied: ν1>50 where ν1 is an Abbe number of the first lens.

12. The imaging lens according to claim 10, wherein each of the second lens and the third lens is a plastic lens.

13. The imaging lens according to claim 12, wherein the following conditional expression is satisfied: D5/f<0.15 where D5 is an air distance between the second lens and the third lens along an optical axis.

14. The imaging lens according to claim 12, wherein the following conditional expression is satisfied: ν1>50 where ν1 is an Abbe number of the first lens.

15. The imaging lens according to claim 14, wherein the following conditional expression is satisfied: D5/f<0.15 where D5 is an air distance between the second lens and the third lens along an optical axis.

16. The imaging lens according to claim 1, wherein the following conditional expression is satisfied: 0.8<f2/|f3|<1.2 where f2 is a focal length of the second lens and f3 is a focal length of the third lens.

17. The imaging lens according to claim 1, wherein the following conditional expression is satisfied: −1.1<EXP/f<−0.6 where EXP is a paraxial exit pupil position relative to an imaging position of an imaging optical system for an object at infinity and f is the focal length of the lens system.

* * * * *